(12) United States Patent
Kingsford

(10) Patent No.: US 7,395,244 B1
(45) Date of Patent: Jul. 1, 2008

(54) CRITICALITY CLASSIFICATION SYSTEM AND METHOD

(75) Inventor: Bryan Kingsford, Orem, UT (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 10/876,193

(22) Filed: Jun. 23, 2004

(51) Int. Cl.
*G06Q 99/10* (2006.01)

(52) U.S. Cl. ............................ 705/52; 707/100; 707/10

(58) Field of Classification Search ................. 709/238, 709/206; 719/332; 707/1, 103, 100, 10; 715/803; 370/379, 428
See application file for complete search history.

(56) References Cited

U.S. PATENT DOCUMENTS 5,675,784 A * 10/1997 Maxwell et al. ............. 707/100

2003/0046421 A1 * 3/2003 Horvitz et al. .............. 709/238
2005/0091184 A1 * 4/2005 Seshadri et al. ................ 707/1
2005/0091269 A1 * 4/2005 Gerber et al. ........... 707/103 X
2005/0091674 A1 * 4/2005 Knight et al. ................ 719/332

OTHER PUBLICATIONS

Sanjay Ranada, Software for mass storage systems, Sep.-Oct. 1990, Optical Information Systems, vol. 10, No. 5, pp. 256(14).*

* cited by examiner

*Primary Examiner*—James P. Trammell
*Assistant Examiner*—Behrang Badii
(74) *Attorney, Agent, or Firm*—Gunnison, McKay & Hodgson, L.L.P.; Serge J. Hodgson (57) ABSTRACT

A method includes determining usage of assets, and determining criticality classifications of the assets based on the usage. The criticality classifications of assets are calculated automatically and without requiring security personnel to classify assets and enter the criticality classifications manually. The calculation of criticality classifications is performed repeatedly insuring that the criticality classifications remain current over time.

19 Claims, 4 Drawing Sheets

CRITICALITY CLASSIFICATION SYSTEM AND METHOD

BACKGROUND OF THE INVENTION

1. Field of the Invention

The present invention relates to computer systems. More particularly, the present invention relates to asset classification systems.

2. Description of Related Art

Computer system assets are classified for a variety of reasons. Commonly, an asset is classified based upon the asset's importance to an organization. For example, if an asset is essential to an organization's operations, the asset is given a high asset classification.

Asset classifications are used for a variety of purposes. For example, asset classifications are used in prioritization of security incidents. Generally, an asset that has a high asset classification will be given priority over an asset that has a low asset classification in prioritizing responses to security incidents of the same magnitude.

Commonly, security personnel are tasked with classifying assets. However, determining whether an asset is important to an organization is often difficult. In addition, manually entering the asset classification information is a time-consuming task. Further, an asset's importance to an organization is dynamic and frequently changes over time. Thus, security personnel should periodically review all of the assets of an organization and repeatedly determine the importance of each asset. However, asset classification is generally given a low priority for security personnel with the result being that the asset classifications are frequently outdated, inaccurate and relatively meaningless.

SUMMARY OF THE INVENTION

In accordance with one embodiment, a method includes determining usage of assets, and determining criticality classifications of the assets based on the usage. Thus, criticality classifications of assets are calculated automatically and without requiring security personnel to classify assets and enter the asset classifications manually. This calculation of criticality classifications can be performed repeatedly insuring that the criticality classifications remain current over time.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
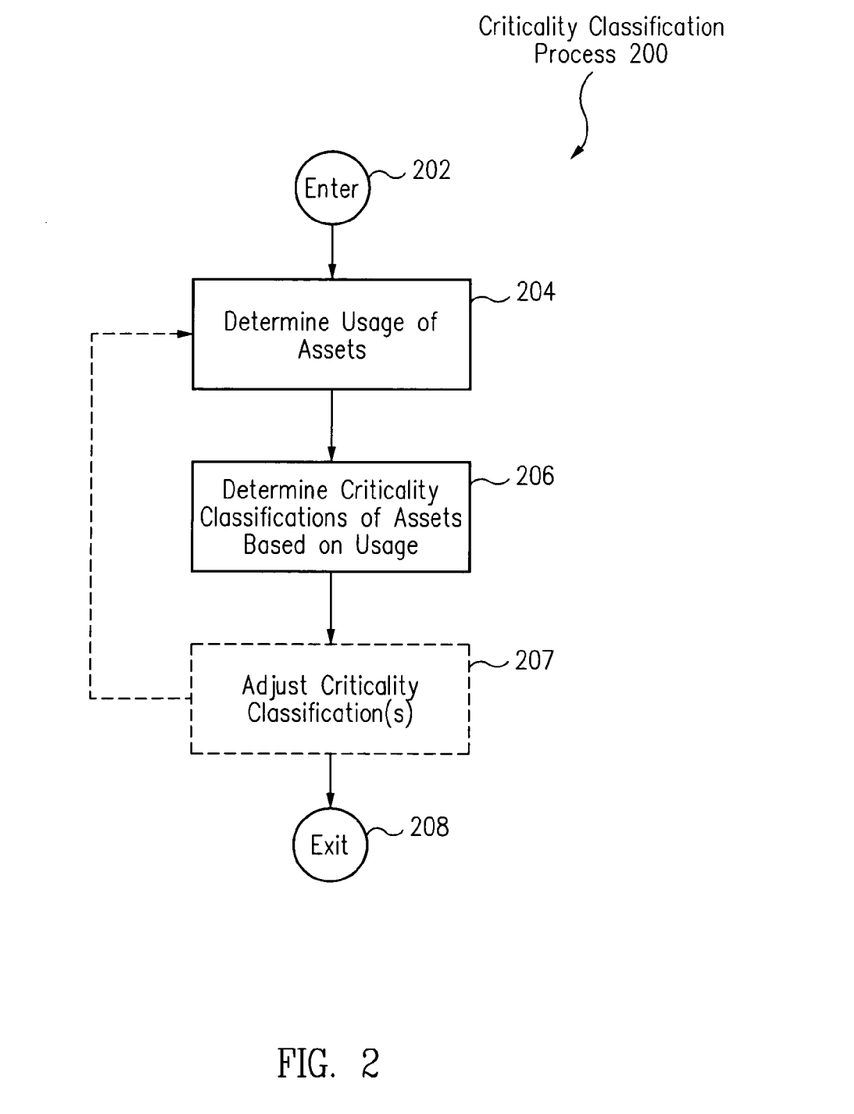
FIG. 2 is a flow diagram of a criticality classification process in accordance with one embodiment of the present invention.

In accordance with one embodiment, referring to FIG. 2, a method includes determining usage of assets in a DETERMINE USAGE OF ASSETS OPERATION 204, and determining criticality classifications of the assets based on the usage in a DETERMINE CRITICALITY CLASSIFICATIONS OF ASSETS BASED ON USAGE OPERATION 206. Thus, criticality classifications of assets are calculated automatically and without requiring security personnel to classify assets and enter the asset classifications manually. This calculation of criticality classifications can be performed repeatedly insuring that the criticality classifications remain current over time.

Figure 1:
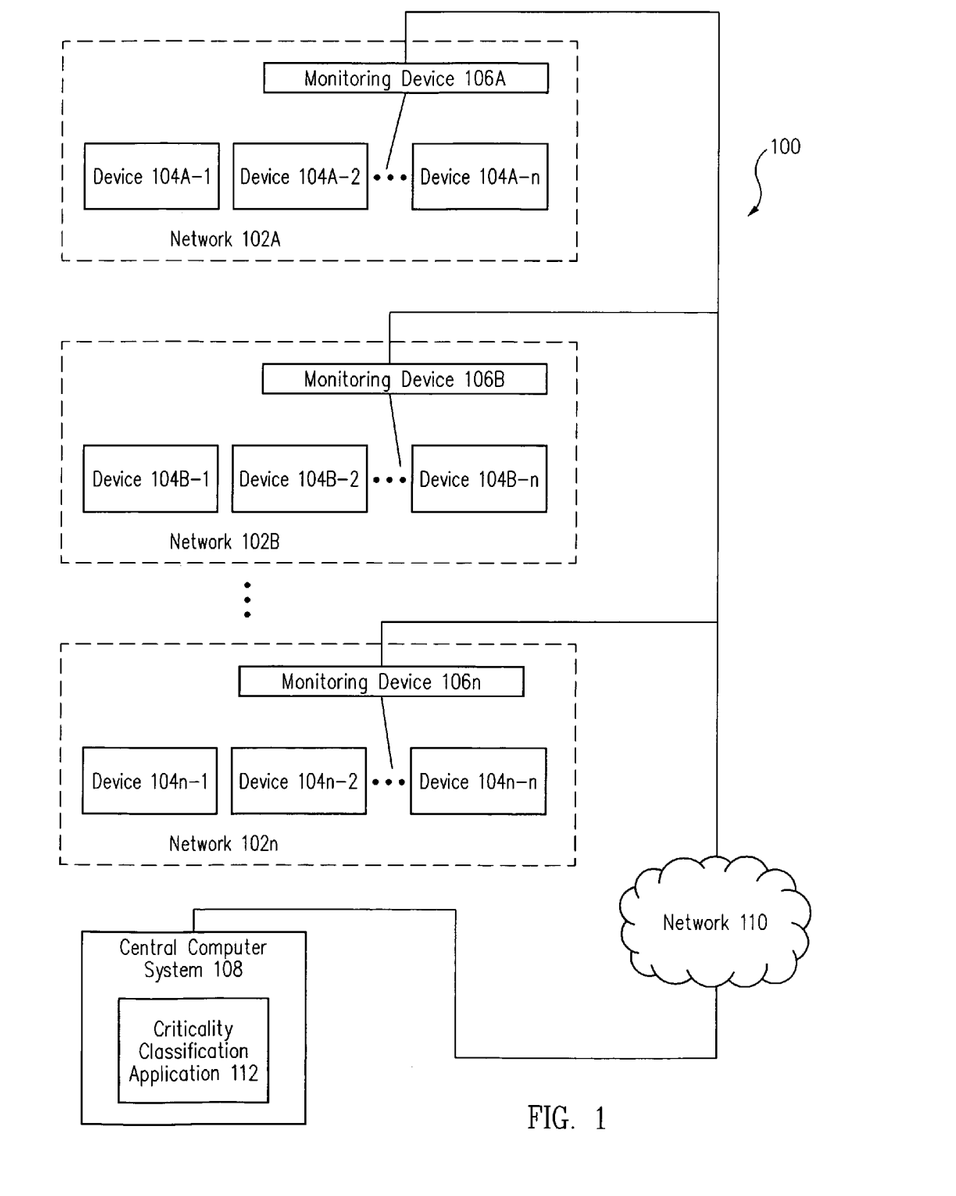
FIG. 1 is a diagram of a computer system that includes a plurality of networks in accordance with one embodiment of the present invention.

More particularly, FIG. 1 is a diagram of a computer system 100, sometimes called an enterprise, that includes a plurality of networks 102A, 102B, . . . , 102n, collectively networks 102, in accordance with one embodiment of the present invention. Referring to network 102A, network 102A includes a plurality of interconnected devices 104A-1, 104A-2, . . . , 104A-n, collectively devices 104A. Network 102A further includes a monitoring device 106A also coupled to devices 104A-1, 104A-2, . . . , 104A-n.

Similarly, networks 102B, . . . , 102n also include a plurality of interconnected devices 104B-1, 104B-2, . . . , 104B-n, . . . , 104n-1, 104n-2, . . . , 104n-n, respectively. Devices 104B-1, 104B-2, . . . , 104B-n, 104n-1, 104n-2, . . . , 104n-n, are collectively referred to as devices 104B, . . . , 104n, respectively.

Networks 102B, . . . , 102n further include monitoring devices 106B, . . . , 106n also coupled to devices 104B, . . . , 104n, respectively.

Devices 104A, 104B, . . . , 104n and monitoring devices 106A, 106B, . . . , 106n are collectively referred to as devices 104 and monitoring devices 106, respectively.

The particular type of and configuration of networks 102, devices 104 and monitoring devices 106 are not essential to this embodiment of the present invention.

Networks 102, and, more particularly, monitoring devices 106 are coupled to a central computer system 108 by a network 110. Network 110 is any network or network system that is of interest to a user. A criticality classification application 112 is executing on central computer system 108.

FIG. 2 is a flow diagram of a criticality classification process 200 in accordance with one embodiment of the present invention. Execution of criticality classification application 112 on central computer system 108 results in the operations of criticality classification process 200 as described below in one embodiment.

Referring now to FIGS. 1 and 2 together, from an ENTER OPERATION 202, flow moves to a DETERMINE USAGE OF ASSETS OPERATION 204. In DETERMINE USAGE OF ASSETS OPERATION 204, the usage of assets of a computer system is determined.

In one embodiment, an asset is a computer system such as a server, a network device such as a firewall, router or switch, a service executing on a computer system, or a file or collection of files. In accordance with various embodiments, an asset includes a customer relationship management (CRM) system, an e-mail system, a web service, a payroll system and a business to consumer website. Usage is generally a measurement of the utilization of an asset.

Referring to the example illustrated in FIG. 1, monitoring devices 106, devices 104, networks 102, network 110 and central computer system 108 and/or services executing thereon are assets in one embodiment.

In one embodiment, usage is defined as the network activity related to an asset. In one embodiment, network activity is the number of network events of the asset. Examples of network events of an asset include connections with the asset, e.g., TCP/IP connections or handshakes, requests for the address of an asset, and packet transmission to and/or from the asset.

In another embodiment, usage is defined as the number of security events of the asset. Examples of security events of an asset include break-in attempts, attempts to form a connection with the asset, e.g., login attempts and authentication attempts, denial of a connection with the asset and successful connections with the asset.

In other embodiments, usage is defined by logins, syslog entries, packets, audit trail entries, disk access, a transaction log for a database, or a combination thereof, of the asset.

In one embodiment, usage includes both malicious and non-malicious usage of an asset. More particularly, if an asset is being attacked, the usage of the asset will increase compared to normal operation of the asset. As discussed further below, an increase in usage of an asset results in an increase in the criticality classification of the asset. Thus, the asset will get a higher priority in incident management resulting in an earlier response to the attack in one embodiment.

In another embodiment, usage is defined by dependency, i.e., the number of other assets that are dependent upon an asset.

Usage information on the usage of an asset is obtained from a variety of sources in accordance with various embodiments of the present invention. These sources include the asset itself, firewalls, intrusion detection systems, security management systems and network management systems.

Referring again to the example illustrated in FIG. 1, monitoring devices 106 monitor usage of devices 104 on networks 102 and provide the information to central computer system 108 in one embodiment. However, other devices can collect information on the usage of an asset, for example, a device 104 collects information on its usage and provides the information to central computer system 108.

In one embodiment, a network management system is used to collect information on the usage of an asset. Generally, a network management system is a system that collects information about certain types of events. Examples of suitable network management systems include TIVOLI® by IBM®, HP OPENVIEW®, CA UNICENTER®, and BMC PATROL®.

From DETERMINE USAGE OF ASSETS OPERATION 204, flow moves to a DETERMINE CRITICALITY CLASSIFICATIONS OF ASSETS BASED ON USAGE OPERATION 206. In DETERMINE CRITICALITY CLASSIFICATIONS OF ASSETS BASED ON USAGE OPERATION 206, the assets are classified based upon their usage. More particularly, the assets are classified by calculating a criticality classification for each asset based upon the usage of the asset as determined in DETERMINE USAGE OF ASSETS OPERATION 204.

Generally, a criticality classification is the ranking, sometimes called measure, of the importance of an asset relative to other assets used by an organization. In accordance with this embodiment, the criticality classification of an asset is directly proportional to the usage of the asset. Accordingly, the greater the usage of the asset, the greater the criticality classification of the asset.

In one embodiment, a criticality classification ranges from 0 to about 100, e.g., 99.99. More particularly, an asset that has a criticality classification of zero has less usage than any other asset of the computer system. Conversely, an asset that has a criticality classification of about 100 has more usage than any other asset of the computer system. In one embodiment, the criticality classification equals the percentile score for the asset. The percentile score is calculated for each asset during DETERMINE USAGE OF ASSETS OPERATION 204 as set forth below in one embodiment.

From DETERMINE CRITICALITY CLASSIFICATIONS OF ASSETS BASED ON USAGE OPERATION 206, flow moves to, optionally, an ADJUST CRITICALITY CLASSIFICATION(S) OPERATION 207. In ADJUST CRITICALITY CLASSIFICATION(S) OPERATION 207, one or more criticality classifications are adjusted, i.e., are set to be greater or less than the criticality classification calculated in DETERMINE CRITICALITY CLASSIFICATIONS OF ASSETS BASED ON USAGE OPERATION 206.

For example, a critical asset, i.e., one that is critical to an organization, is not used very often. Accordingly, the usage of the critical asset determined in DETERMINE USAGE OF ASSETS OPERATION 204 is low. Thus, the criticality classification calculated in DETERMINE CRITICALITY CLASSIFICATIONS OF ASSETS BASED ON USAGE OPERATION 206 is also low. The criticality classification is set, e.g., manually by a user such as security personnel, to be greater than the criticality classification calculated in DETERMINE CRITICALITY CLASSIFICATIONS OF ASSETS BASED ON USAGE OPERATION 206 in ADJUST CRITICALITY CLASSIFICATION(S) OPERATION 207 to reflect the importance of the critical asset. In one embodiment, a critical asset is an asset that an organization will suffer a detriment, e.g., a loss of business, if the asset becomes unavailable.

Conversely, a non-critical asset, i.e., one that is not important to an organization, is used very often. Accordingly, the usage of the non-critical asset determined in DETERMINE USAGE OF ASSETS OPERATION 204 is high. Thus, the criticality classification calculated in DETERMINE CRITICALITY CLASSIFICATIONS OF ASSETS BASED ON USAGE OPERATION 206 is also high. The criticality classification is set to be less than the criticality classification calculated in DETERMINE CRITICALITY CLASSIFICATIONS OF ASSETS BASED ON USAGE OPERATION 206 in ADJUST CRITICALITY CLASSIFICATION(S) OPERATION 207 to reflect the low importance of the non-critical asset.

In another embodiment, ADJUST CRITICALITY CLASSIFICATION(S) OPERATION 207 is not performed and thus is an optional operation.

From ADJUST CRITICALITY CLASSIFICATION(S) OPERATION 207 (or directly from DETERMINE CRITICALITY CLASSIFICATIONS OF ASSETS BASED ON USAGE OPERATION 206 if ADJUST CRITICALITY CLASSIFICATION(S) OPERATION 207 is not performed) flow moves to and exits at an EXIT OPERATION 208.

In another embodiment, from ADJUST CRITICALITY CLASSIFICATION(S) OPERATION 207 (or directly from DETERMINE CRITICALITY CLASSIFICATIONS OF ASSETS BASED ON USAGE OPERATION 206 if ADJUST CRITICALITY CLASSIFICATION(S) OPERATION 207 is not performed) flow returns to DETERMINE USAGE OF ASSETS OPERATION 204 as indicated by the dashed arrow and criticality classification process 200 is repeated. In accordance with this embodiment, criticality classifications of assets based upon usage of assets are repeatedly calculated.

Accordingly, criticality classifications are kept current and reflect the dynamic nature of assets, i.e., reflect the change in importance of assets to an organization over time.

As set forth above, usage of assets is determined and based upon this usage, criticality classifications of assets are calculated. Thus, criticality classifications of assets are calculated automatically and without requiring security personnel to classify assets and enter the asset classifications manually. This calculation of criticality classifications is performed repeatedly in one embodiment insuring that the criticality classifications remain current over time.

A criticality classification is used as a factor, e.g., for prioritization, of management of an asset. For example, a criticality classification is used to prioritize tasks such as incident management.

To illustrate, assume the case where there are two equal incidents on two different computer systems (assets), a first one of the computer systems has a criticality classification in the $90^{th}$ percentile and the second one of the computer systems has a criticality classification in the $30^{th}$ percentile. In prioritizing the response to the incidents, the incident occurring on the computer system that has a criticality classification in the $90^{th}$ percentile should receive the first attention since it is the asset that is the most valuable to the organization based on its usage.

In another example, the criticality classification is weighted with other factors such as the event severity. For example, a composite event severity is the criticality classification multiplied by the event severity.

In another example, criticality classification is used to prioritize other tasks. For example, criticality classification is used to prioritize responses from information technology (IT) helpdesks, i.e., a question dealing with an asset that has a high criticality classification gets priority over a question dealing with an asset that has a low criticality classification. Other examples of tasks in which criticality classifications are used include vulnerability management, audit development, priority of deployment of patches and other controls.

In one embodiment, criticality classifications are a subset of asset classifications, e.g., asset classifications are based on the criticality classifications as well as other factors. In another embodiment, criticality classifications are used as the asset classifications themselves. Utilization of asset classifications is well known to those of skill in the art and the particular usage of an asset classification is not essential to this embodiment of the present invention.

Figure 3:
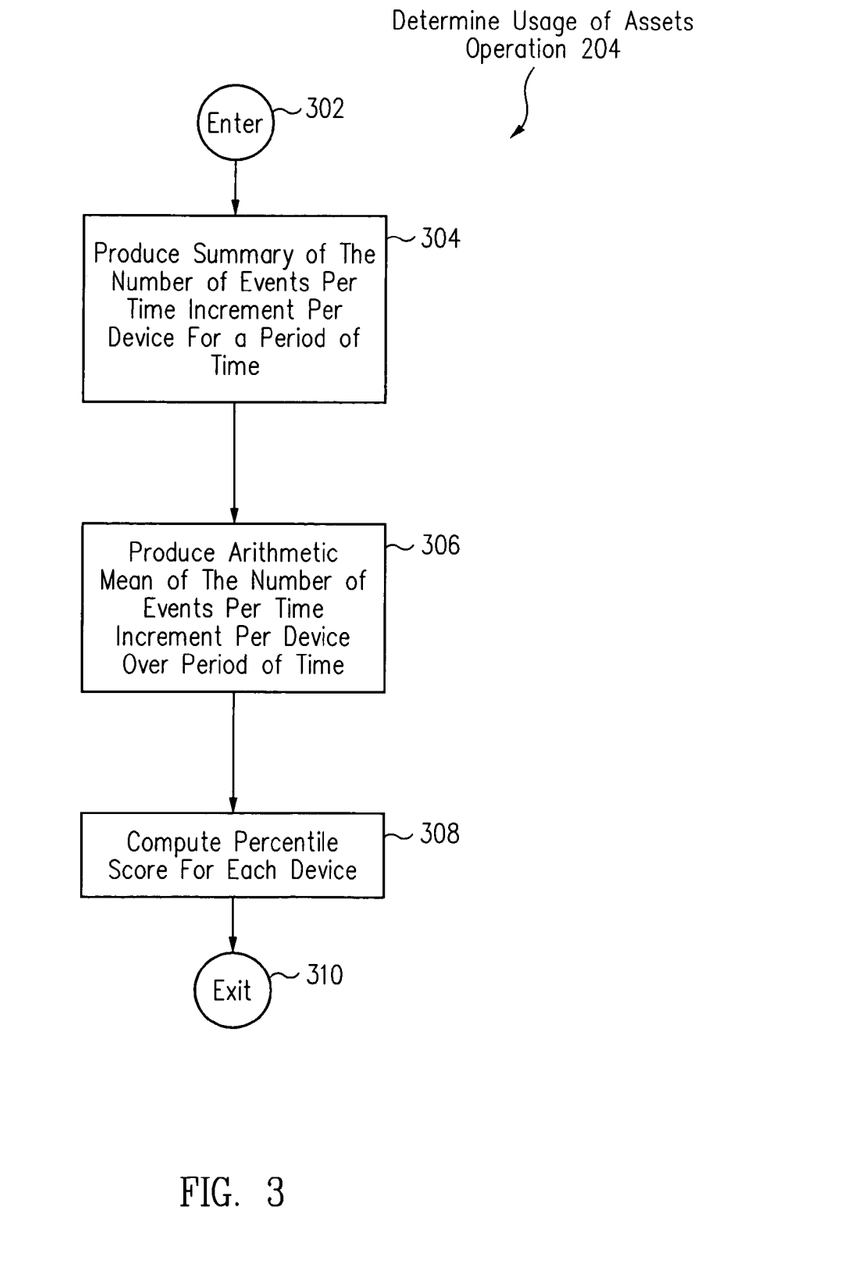
FIG. 3 is a flow diagram of a determine usage of assets operation of the criticality classification process of FIG. 2 in accordance with one embodiment of the present invention.

FIG. 3 is a flow diagram of a DETERMINE USAGE OF ASSETS OPERATION 204 of criticality classification process 200 of FIG. 2 in accordance with one embodiment of the present invention. Referring now to FIGS. 2 and 3 together, from an ENTER OPERATION 302 (and from ENTER OPERATION 202 of FIG. 2), flow moves to a PRODUCE SUMMARY OF THE NUMBER OF EVENTS PER TIME INCREMENT PER DEVICE FOR A PERIOD OF TIME OPERATION 304.

In PRODUCE SUMMARY OF THE NUMBER OF EVENTS PER TIME INCREMENT PER DEVICE FOR A PERIOD OF TIME OPERATION 304, a summary of the number of events per time increment per device over a period of time is produced. Events include network events and/or security events, which are discussed further above. Further, a device is an asset as set forth above.

In one embodiment, the time increment is a day and the time period is a week. Thus, in PRODUCE SUMMARY OF THE NUMBER OF EVENTS PER TIME INCREMENT PER DEVICE FOR A PERIOD OF TIME OPERATION 304, a summary of the number of events per day per device over a week is produced. However, any one of a number of time increments and time periods can be selected depending upon the particular frequency of updating of the criticality classifications desired.

In one embodiment, each event for each device is recorded. For example, each device includes an associated counter. When an event occurs for a device, the associated counter is incremented.

At a particular time each day, the number of events per device is recorded. More particularly, the number of events for each device over the past day is recorded, e.g., in a common data-store. Illustratively, the event number of each counter for each device is read, i.e., the counters are read, and the event number is recorded. The counters are reset and event recording begins again for the next day.

This procedure is repeated for a period of time, e.g., one week. At the end of the week, a summary of the number of events per day per device for the week is produced.

From PRODUCE SUMMARY OF THE NUMBER OF EVENTS PER TIME INCREMENT PER DEVICE FOR A PERIOD OF TIME OPERATION 304, flow moves to a PRODUCE ARITHMETIC MEAN OF THE NUMBER OF EVENTS PER TIME INCREMENT PER DEVICE OVER PERIOD OF TIME OPERATION 306. In PRODUCE ARITHMETIC MEAN OF THE NUMBER OF EVENTS PER TIME INCREMENT PER DEVICE OVER PERIOD OF TIME OPERATION 306, an arithmetic mean of the number of events per time increment, e.g., day, per device over the period of time, e.g., week, is produced. The arithmetic mean, sometimes called average, of the number of events per time increment per device over the period of time is referred to as the average number of events per device.

From PRODUCE ARITHMETIC MEAN OF THE NUMBER OF EVENTS PER TIME INCREMENT PER DEVICE OVER PERIOD OF TIME OPERATION 306, flow moves to a COMPUTE PERCENTILE SCORE FOR EACH DEVICE OPERATION 308. In COMPUTE PERCENTILE SCORE FOR EACH DEVICE OPERATION 308, a percentile score for each device is calculated. Generally, the percentile score ranges from zero to about 100.

In one embodiment, for each asset, a numerical score is calculated. The numerical score of an asset is the number of other assets that have an arithmetic mean of the number of events per time increment per period of time less than the arithmetic mean of the number of events per time increment per period of time for the asset. Stated another way, the numerical score of an asset is the number of other assets that have an average number of events less than the average number of events for the asset.

Using the numerical score, the percentile score for the asset is calculated. The percentile score of an asset is calculated by dividing the numerical score for the asset by the total number of assets and expressing the result as a percentage.

For example, assume there are three assets and the first asset has an average number of events of two, the second asset has an average number of events of three, and the third asset has an average number of events of five. The numerical scores for the first, second and third assets is 0, 1, and 2, respectively. That is, the number of other assets that had a lower average number of events than the first, second, and third assets is 0, 1, and 2, respectively. The percentile score for the first, second and third assets is 0% (zero divided by three expressed as a percentage), 33.33% (one divided by three expressed as a percentage) and $66.\overline{66}$% (two divided by three expressed as a percentage), respectively.

From COMPUTE PERCENTILE SCORE FOR EACH DEVICE OPERATION 308, flow moves to and exits at an EXIT OPERATION 310, and returns to DETERMINE CRITICALITY CLASSIFICATIONS OF ASSETS BASED ON USAGE OPERATION 206 of FIG. 2.

Figure 4:
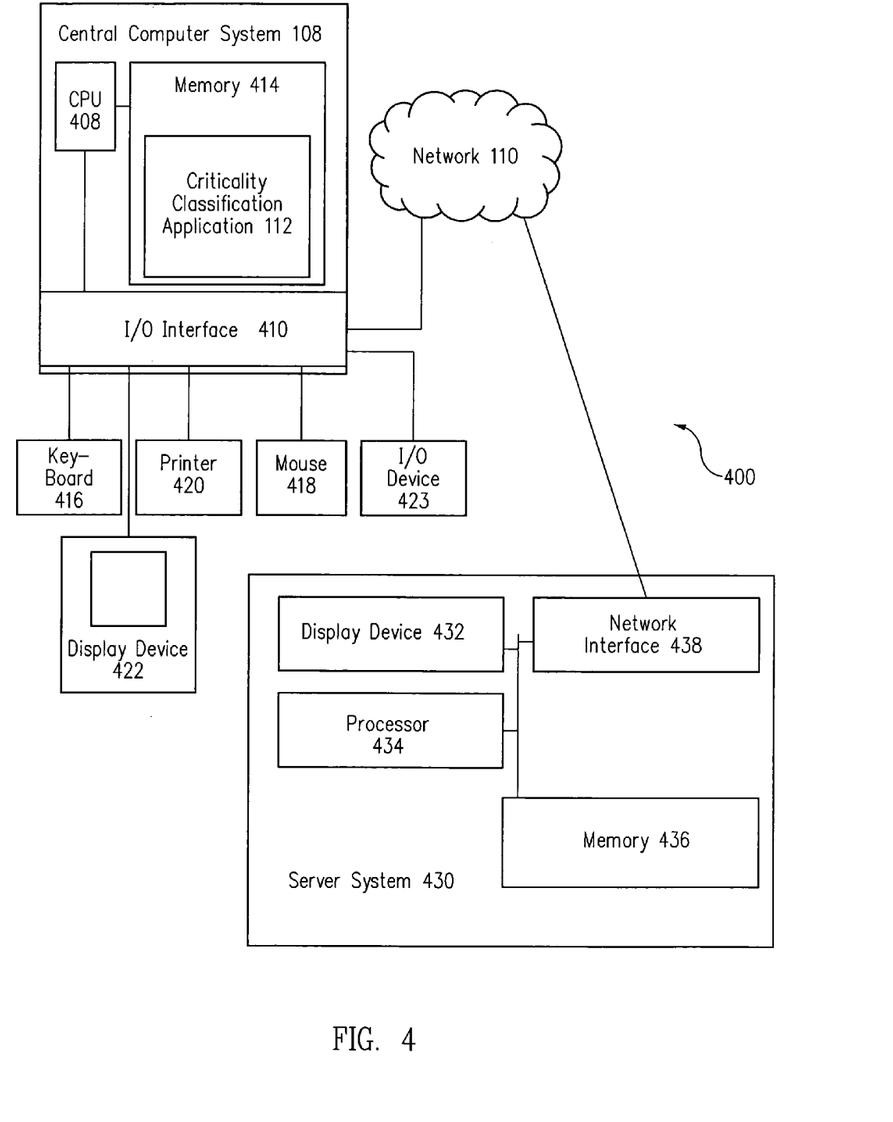
FIG. 4 is a diagram of a client-server system that includes a criticality classification application executing on a central computer system in accordance with one embodiment of the present invention.

FIG. 4 is a diagram of a client-server system 400 that includes criticality classification application 112 executing on a central computer system 108, e.g., a first computer system, in accordance with one embodiment of the present invention. Referring now to FIGS. 1 and 4 together, central computer system 108 is representative of central computer system 108 of FIG. 1 in one embodiment. Further, client-server system 400 is part of computer system 100 in one embodiment.

Central computer system 108, sometimes called a client or user device, typically includes a central processing unit (CPU) 408, hereinafter processor 408, an input output (I/O) interface 410, and a memory 414. Central computer system 108 may further include standard devices like a keyboard 416, a mouse 418, a printer 420, and a display device 422, as well as, one or more standard input/output (I/O) devices 423, such as a compact disk (CD) or DVD drive, floppy disk drive, or other digital or waveform port for inputting data to and outputting data from central computer system 108. In one embodiment, criticality classification application 112 is loaded into central computer system 108 via I/O device 423, such as from a CD, DVD or floppy disk containing criticality classification application 112.

Central computer system 108 is coupled to a server system 430 of client-server system 400 by network 110. Server system 430 typically includes a display device 432, a processor 434, a memory 436, and a network interface 438.

Network 110 can be any network or network system that is of interest to a user. In various embodiments, network interface 438 and I/O interface 410 include analog modems, digital modems, or a network interface card.

Criticality classification application 112 is stored in memory 414 of central computer system 108 and executed on central computer system 108. The particular type of and configuration of central computer system 108 and server system 430 are not essential to this embodiment of the present invention.

Criticality classification application 112 is in computer memory 414. As used herein, a computer memory refers to a volatile memory, a non-volatile memory, or a combination of the two.

Although criticality classification application 112 is referred to an application, this is illustrative only. Criticality classification application 112 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 4, this medium may belong to the computer system itself. However, the medium also may be removed from the computer system. For example, criticality classification application 112 may be stored in memory 436 that is physically located in a location different from processor 408. Processor 408 should be coupled to the memory 436. This could be accomplished in a client-server system, or alternatively via a connection to another computer via modems and analog lines, digital interfaces and a digital carrier line, or wireless or cellular connections.

More specifically, in one embodiment, central computer system 108 and/or server system 430 is a portable computer, a workstation, a two-way pager, a cellular telephone, a smart phone, a digital wireless telephone, a personal digital assistant, a server computer, an Internet appliance, or any other device that includes components that can execute the criticality classification functionality in accordance with at least one of the embodiments as described herein. Similarly, in another embodiment, central computer system 108 and/or server system 430 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the criticality classification functionality in accordance with one embodiment of the present invention can be implemented in a wide variety of computer system configurations. In addition, the criticality classification functionality could be stored as different modules in memories of different devices. For example, criticality classification application 112 could initially be stored in server system 430, and then as necessary, a portion of criticality classification application 112 could be transferred to central computer system 108 and executed on central computer system 108. Consequently, part of the criticality classification functionality would be executed on processor 434 of server system 430, and another part would be executed on processor 408 of central computer system 108. In view of this disclosure, those of skill in the art can implement various embodiments of the present invention in a wide-variety of physical hardware configurations using an operating system and computer programming language of interest to the user.

In yet another embodiment, criticality classification application 112 is stored in memory 436 of server system 430. Criticality classification application 112 is transferred over network 110 to memory 414 in central computer system 108. In this embodiment, network interface 438 and I/O interface 410 would include analog modems, digital modems, or a network interface card. If modems are used, network 110 includes a communications network, and criticality classification application 112 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
   determining actual and attempted usage of assets, said attempted usage of assets being monitored by a monitoring device on a network, said assets being selected from the group of hardware devices consisting of computer systems and network devices, said assets comprising a critical asset and a non-critical asset, said critical asset having a greater importance than said non-critical asset, said usage of said critical asset being less than said usage of said non-critical asset, said usage being a measure of the actual and attempted utilization of said assets comprising the number of security events of said assets, said security events comprising break-in attempts on said assets, attempts to form connections with said assets, denial of connections with said assets, and successful connections with said assets, said determining actual and attempted usage of assets comprising:

producing a summary of a number of events per time increment per asset for a period of time, said events comprising said security events;

producing an arithmetic mean of said number of events per time increment per asset for a period of time; and determining percentile scores for said assets; and determining criticality classifications of said assets based on said usage, said criticality classifications being directly proportional to said usage such that a first criticality classification for said critical asset is less than a second criticality classification for said non-critical asset.

2. The method of claim 1 wherein said computer systems comprise servers.

3. The method of claim 1 wherein said network devices are selected from the group consisting of firewalls, routers, and switches.

4. The method of claim 1 wherein said usage comprises network activity related to said assets.

5. The method of claim 4 wherein said network activity comprises the number of network events of said assets.

6. The method of claim 1 wherein said usage comprises malicious and non-malicious usage of said assets.

7. The method of claim 1 wherein said determining actual and attempted usage of assets comprises obtaining usage information on said usage.

8. The method of claim 7 wherein said usage information is obtained from a source selected from network and security systems.

9. The method of claim 1 further comprising adjusting at least one of said criticality classifications.

10. The method of claim 9 wherein a first asset of said assets is said critical asset that has low usage, said adjusting at least one of said criticality classifications comprising increasing a said first criticality classification of said critical asset.

11. The method of claim 1 wherein said determining actual and attempted usage of assets and said determining criticality classifications of said assets based on said usage are repeatedly performed.

12. The method of claim 1 further comprising keeping said criticality classifications of said assets current by repeatedly performing said determining actual and attempted usage of assets and said determining criticality classifications of said assets based on said usage.

13. The method of claim 1 wherein said criticality classifications are used as factors in management of said assets.

14. A computer implemented method comprising:
determining actual and attempted usage of assets comprising determining a first actual and attempted usage of a first critical asset and a second actual and attempted usage of a second non-critical asset, said attempted usage of said assets being monitored by a monitoring device on a network, said first and second assets being selected from the group of hardware devices consisting of computer systems and network devices, said first critical asset having a greater importance than said second non-critical asset, said first usage being less than said second usage, said determining actual and attempted usage of assets comprising:

producing a summary of a number of events per time increment per asset for a period of time, said events comprising security events comprising break-in attempts on said assets, attempts to form connections with said assets, denial of connections with said assets, and successful connections with said assets;

producing an arithmetic mean of said number of events per time increment per asset for a period of time; and determining percentile scores for said assets; and determining a first criticality classification of said first asset and a second criticality classification of said second asset, said first criticality classification being directly proportional to said first usage comprising the number of security events of said first asset, said security events of said first asset comprising break-in attempts on said first asset, attempts to form connections with said first asset, denial of connections with said first asset, and successful connections with said first asset, said second criticality classification being directly proportional to said second usage comprising the number of security events of said second asset, said security events of said second asset comprising break-in attempts on said second asset, attempts to form connections with said second asset, denial of connections with said second asset, and successful connections with said second asset, wherein said first criticality classification is less than said second criticality classification.

15. The method of claim 14 wherein said first criticality classification and said second criticality classification are equal to a first percentile score for said first asset and a second percentile score for said second asset.

16. The method of claim 1 wherein said determining percentile scores for said assets comprises:
determining numerical scores for said assets, a numerical score of an asset being the number of other assets that have an average number of events less than an average number of events for said asset; and
dividing said numerical scores by the total number of assets.

17. A computer system comprising:
a means for determining actual and attempted usage of assets comprising a monitoring device on a network for monitoring said attempted usage of assets, said assets being selected from the group of hardware devices consisting of computer systems and network devices, said assets comprising a critical asset and a non-critical asset, said critical asset having a greater importance than said non-critical asset, said usage of said critical asset being less than said usage of said non-critical asset, said usage being a measure of the actual and attempted utilization of said assets comprising the number of security events of said assets, said security events comprising break-in attempts on said assets, attempts to form connections with said assets, denial of connections with said assets, and successful connections with said assets, said means for determining actual and attempted usage of assets further comprising:

a means for producing a summary of a number of events per time increment per asset for a period of time, said events comprising said security events;

a means for producing an arithmetic mean of said number of events per time increment per asset for a period of time; and a means for determining percentile scores for said assets; and a means for determining criticality classifications of said assets based on said usage, said criticality classifications being directly proportional to said usage such that a first criticality classification for said critical asset is less than a second criticality classification for said non-critical asset.

18. A computer-program product comprising a tangible computer-readable storage medium containing computer program code comprising:

a criticality classification application for determining actual and attempted usage of assets, said attempted usage of assets being monitored by a monitoring device on a network, said assets being selected from the group of hardware devices consisting of computer systems and network devices, said assets comprising a critical asset and a non-critical asset, said critical asset having a greater importance than said non-critical asset, said usage of said critical asset being less than said usage of said non-critical asset, said usage being a measure of the actual and attempted utilization of said assets comprising the number of security events of said assets, said security events comprising break-in attempts on said assets, attempts to form connections with said assets, denial of connections with said assets, and successful connections with said assets, said criticality classification application further for:

producing a summary of a number of events per time increment per asset for a period of time, said events comprising said security events;

producing an arithmetic mean of said number of events per time increment per asset for a period of time; and determining percentile scores for said assets; and said criticality classification application further for determining criticality classifications of said assets based on said usage, said criticality classifications being directly proportional to said usage such that a first criticality classification for said critical asset is less than a second criticality classification for said non-critical asset.

19. A computer system comprising:

a memory having stored therein a criticality classification application; and a processor coupled to said memory, wherein execution of said criticality classification application generates a method comprising:

determining actual and attempted usage of assets, said attempted usage of assets being monitored by a monitoring device on a network, said assets being selected from the group of hardware devices consisting of computer systems and network devices, said assets comprising a critical asset and a non-critical asset, said critical asset having a greater importance than said non-critical asset, said usage of said critical asset being less than said usage of said non-critical asset, said usage being a measure of the actual and attempted utilization of said assets comprising the number of security events of said assets, said security events comprising break-in attempts on said assets, attempts to form connections with said assets, denial of connections with said assets, and successful connections with said assets, said determining actual and attempted usage of assets comprising:

producing a summary of a number of events per time increment per asset for a period of time, said events comprising said security events;

producing an arithmetic mean of said number of events per time increment per asset for a period of time; and determining percentile scores for said assets; and determining criticality classifications of said assets based on said usage, said criticality classifications being directly proportional to said usage such that a first criticality classification for said critical asset is less than a second criticality classification for said non-critical asset.

* * * * *